United States Patent
Harsha et al.

(10) Patent No.: US 10,372,702 B2
(45) Date of Patent: Aug. 6, 2019

(54) METHODS AND APPARATUS FOR DETECTING ANOMALIES IN ELECTRONIC DATA

(71) Applicant: Intel Corporation, Santa Clara, CA (US)

(72) Inventors: Amith Harsha, Houston, TX (US); Ali Ashrafi, Chapel Hill, NC (US)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 15/392,837

(22) Filed: Dec. 28, 2016

(65) Prior Publication Data
US 2018/0181611 A1 Jun. 28, 2018

(51) Int. Cl.
*G06F 16/00* (2019.01)
*G06F 16/23* (2019.01)
*G06F 16/2455* (2019.01)
*G06F 16/2457* (2019.01)

(52) U.S. Cl.
CPC ...... *G06F 16/2365* (2019.01); *G06F 16/2455* (2019.01); *G06F 16/24578* (2019.01)

(58) Field of Classification Search
CPC ......... G06F 17/30371; G06F 17/30377; G06F 17/30477; G06F 17/3053; G06F 17/30; G06F 17/30864; G06F 17/30719; G06F 17/30867; G06F 17/30997; G06F 17/3097; G06F 17/30991; G06F 17/30648; G06F 17/30637; G06F 16/2365; G06F 16/2455; G06F 16/24578; H04L 69/18; H04L 45/50; G11C 15/043; G11C 15/00; G11C 16/08; G06Q 20/0658; G06Q 50/20
See application file for complete search history.

(56) References Cited

U.S. PATENT DOCUMENTS

| | | | |
|---|---|---|---|
| 5,652,832 A | * | 7/1997 | Kane ................. G06F 11/142 |
| | | | 714/2 |
| 5,802,602 A | | 9/1998 | Rahman et al. |
| 8,909,609 B2 | | 12/2014 | Fleming et al. |

(Continued)

OTHER PUBLICATIONS

Wikipedia, "Content-addressable memory," https://en.wikipedia.org/w/index.php?title=Contentaddressable_memory&oldid=754771812, last modified on Dec. 14, 2016, 5 pages.

(Continued)

*Primary Examiner* — Anh Ly
(74) *Attorney, Agent, or Firm* — Hanley, Flight & Zimmerman, LLC

(57) ABSTRACT

Methods and apparatus for detecting anomalies in electronic data are described. An example apparatus includes a signature generator to generate a signature of context information for electronic transactions and to query a memorybase of previously received electronic transactions to identify a first entity associated with a subset of historical transactions that are associated with the signature, a neighborhood generator to query the memorybase to generate a neighborhood for the first entity, a target category identifier to determine a target category value for entities included in the neighborhood, and an anomaly detector to determine a score for the first entity based on the target category value and to present an alert indicating that the first entity is anomalous based on the score.

23 Claims, 6 Drawing Sheets

(56) References Cited

U.S. PATENT DOCUMENTS

| | | | |
|---|---|---|---|
| 8,972,339 B2 | 3/2015 | Aparicio, IV et al. | |
| 2005/0015220 A1* | 1/2005 | Ramchandi | G06F 9/465 702/188 |
| 2005/0209876 A1* | 9/2005 | Kennis | G06F 17/30569 726/1 |
| 2006/0020974 A1* | 1/2006 | Birnbaum | H04N 21/4431 725/50 |
| 2006/0064583 A1* | 3/2006 | Birnbaum | H04N 21/4345 713/164 |
| 2006/0212487 A1* | 9/2006 | Kennis | G06F 17/30569 707/E17.006 |
| 2008/0301139 A1* | 12/2008 | Wang | G06F 17/30887 707/E17.009 |
| 2011/0072151 A1* | 3/2011 | Sharma | H04L 69/18 709/233 |
| 2012/0137367 A1* | 5/2012 | Dupont | G06F 21/00 726/25 |
| 2012/0271686 A1* | 10/2012 | Silverman | G06Q 10/06 705/14.1 |
| 2013/0337789 A1* | 12/2013 | Johnson | H04W 4/02 455/414.1 |
| 2015/0095887 A1* | 4/2015 | Bhattacharya | G06F 11/362 717/124 |
| 2016/0080405 A1* | 3/2016 | Schler | H04L 63/1425 726/23 |
| 2016/0203490 A1* | 7/2016 | Gupta | G06Q 20/382 705/44 |
| 2017/0032252 A1* | 2/2017 | Feminella | G06N 5/022 707/E17.045 |

OTHER PUBLICATIONS

Paul Hofmann, "Big data. How is it stored and analyzed? How the saffron associative analytics platform helps," (http://saffrontech.com/big-data-whatis-it-how-is-it-stored-and-analyzedwhitepaper/), Saffron Technology, Inc., 2015, 5 pages.

* cited by examiner

502 — Raw Data from Memorybase

| Index | Name | Occupation | Monthly Transaction Level | City | Account Type |
|---|---|---|---|---|---|
| 1 | John Smith | Physician | $ 20,000 | Seattle | Personal |
| 2 | Jane Doe | Physician | $ 20,000 | Chicago | Personal |
| 3 | Mark Johnson | Physician | $ 20,000 | Dallas | Personal |
| 4 | Peter Wilson | Unemployed | $ 20,000 | Seattle | Personal |
| 5 | Amy Applewhite | Unemployed | $ 2,000 | Nashville | Personal |
| 6 | Robert Anderson | Unemployed | $ 2,000 | Seattle | Personal |
| . | | | | | |
| n | Erin Samson | Attorney | $ 12,000 | Seattle | Personal |

504 — List of entities from Signature

| Index | Name | Occupation | City | Account Type |
|---|---|---|---|---|
| 1 | John Smith | Physician | Seattle | Personal |
| 2 | Jane Doe | Physician | Chicago | Personal |
| 3 | Mark Johnson | Physician | Dallas | Personal |
| 4 | Peter Wilson | Unemployed | Seattle | Personal |

*Signature = Monthly transaction = $20,000*

508 — Neighborhood for Peter Wilson based on Target Value (Occupation)

| Index | Name | Occupation | Monthly Transaction Level | Score |
|---|---|---|---|---|
| 4 | Peter Wilson | Unemployed | $ 20,000 | 0.5 |
| 5 | Amy Applewhite | Unemployed | $ 2,000 | |
| 6 | Robert Anderson | Unemployed | $ 2,000 | |

510 — Neighborhood for Peter Wilson based on Target Value (City)

| Index | Name | City | Monthly Transaction Level | Score |
|---|---|---|---|---|
| 1 | John Smith | Seattle | $ 20,000 | |
| 2 | Jane Doe | Seattle | $ 20,000 | |
| 4 | Peter Wilson | Seattle | $ 20,000 | 0.1 |
| n | Erin Samson | Seattle | $ 12,000 | |

512 — Scores Calculated for All Entities that Match Signature

| Index | Name | Total Score | |
|---|---|---|---|
| 1 | John Smith | 0.45 | |
| 2 | Jane Doe | 0.25 | |
| 3 | Mark Johnson | 0.3 | |
| 4 | Peter Wilson | 0.9 | 2x Std Dev = .512 |

FIG. 5

METHODS AND APPARATUS FOR DETECTING ANOMALIES IN ELECTRONIC DATA

TECHNICAL FIELD

This disclosure relates generally to computing devices in networked environments, and, more particularly, methods and apparatus for detecting anomalies in electronic data.

BACKGROUND

An anomaly is a pattern that does not conform to expected behavior. For example, an electronic communication of a particular type having a value that greatly exceeds other electronic communications of the same type may be considered anomalous. It is often desirable to detect such anomalies. For example, anomalies may be indicative of malicious, fraudulent, erroneous, etc. activities and/or conditions.

Some existing anomaly detection techniques utilized analyze a data value as it relates to other data values to identify an anomaly. For example, a user computing device connected to a network of thousands of other computing devices may be determined to be anomalous when the volume of communications from the user computing device greatly exceeds an average volume of the other computing devices.

BRIEF DESCRIPTION OF THE DRAWINGS

FIG. 5 illustrates an example anomaly detection performed by the example anomaly analyzer of FIG. 1 in accordance with the instructions illustrated in FIGS. 3 and/or 4.

DETAILED DESCRIPTION

Many systems for detecting anomalies analyze a single data field at a time (e.g., determine if an individual's transaction volume appears anomalous). However, such techniques overlook the fact that certain data may appear anomalous on its face, but may not be an anomaly when considered in context. For example, a transaction volume may not be anomalous when considering the occupation of the individual. Methods and apparatus disclosed herein facilitate the detection of anomalies using a plurality of categories of data associated with an entity. Furthermore, the methods and apparatus disclosed herein may be driven by the particular data collected by the system and, thus, does not require a priori definition of the context to be utilized by the analysis system.

Figure 1:
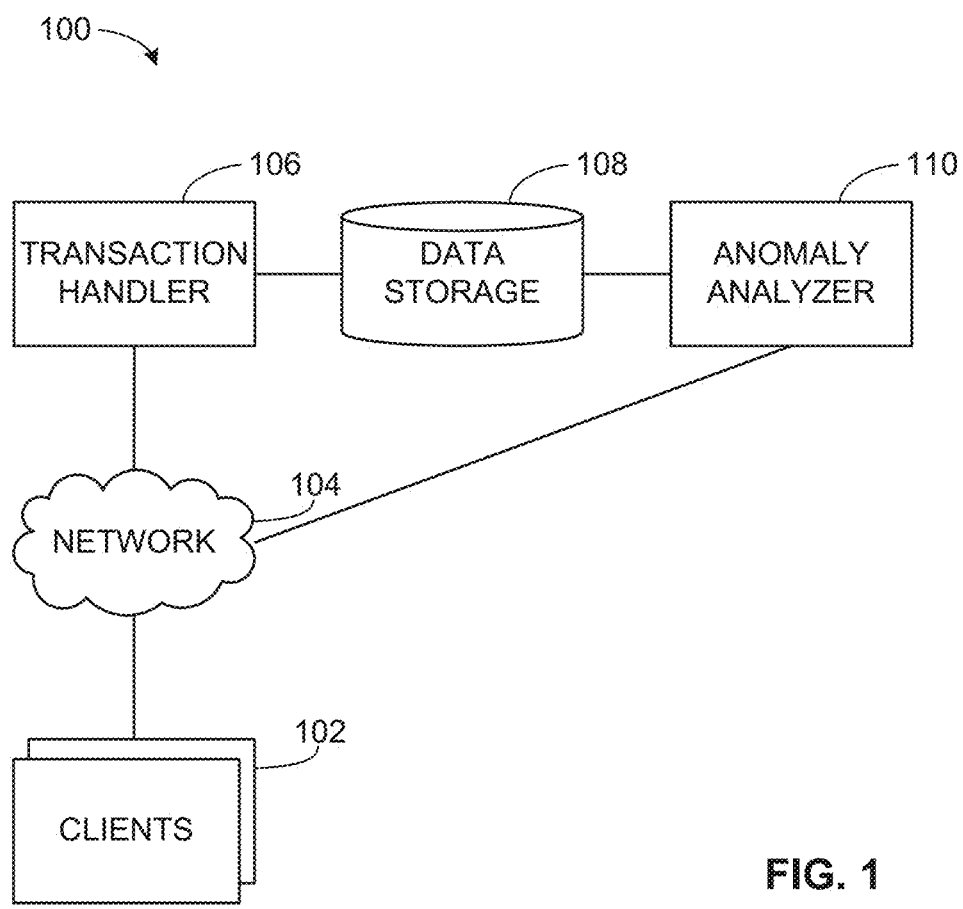
FIG. 1 is a block diagram of an example environment in which an example anomaly analyzer detect anomalies in electronic transaction data.

FIG. 1 is a block diagram of an example environment 100 in which electronic transaction data is analyzed to detect anomalies. As used herein, the terms transaction and entity are used interchangeably. A transaction and/or entity may be any type of record for which anomaly detection is to be analyzed and for which context data (e.g., other information related to the transaction/entity is available (e.g., a transaction and/or entity may be an individual, may be a financial transaction, may be an electronic file, may be a computing device, may be an electronic communication, etc.).

The example environment 100 includes example clients 102, an example network 104, an example transaction handler 106, an example data storage 108, and an example anomaly analyzer 110. According to the illustrated example, the clients 102 submit transactions to the transaction handler 106 via the example network 104. The example transaction handler 106 processes the transactions and stores the transactions in the example data storage 108. The example anomaly analyzer 110 analyzes the transactions stored in the example data storage 108 to detect anomalies and takes an action(s) when an anomaly is detected.

The example clients 102 are computing devices that transmit electronic transaction data to the transaction handler 106 via the example network 104. For example, the example clients 102 are personal computers and a user may operate one of the clients 102 to visit a webpage hosted by the transaction handler 106 and submit a transaction. Alternatively, the clients 102 may be any type of computing device (e.g., a desktop computer, a laptop computer, a mobile computing device, etc.).

As used herein a transaction is a data object associated with an activity (e.g., a transaction may be a banking transaction, a medical billing request or record, an internet communication, a database query, etc.). A transaction may be a request for an action to be performed by the transaction handler 106 (e.g., perform a computation, perform a financial transaction, store a billing record, etc.), a request for data to be returned to the clients 102, etc. According to the illustrated example, transactions are associated with context information. The context information provides additional information about the transaction, information about a user(s) associated with the transaction, information about the clients 102, etc. The context information may be transmitted with the transaction and/or may be transmitted separately from the transaction. For example, for a financial transaction, the context information may include information about a user requesting the transaction (e.g., occupation, home address, age, income level, monthly volume of transactions, etc.). In another example, for a network communication, the context information may be include information about the communication and/or the sender (e.g., a location from which the transaction was sent, a transaction volume, a protocol used, etc.).

The example network 104 is the internet, which communicatively couples the example clients 102 with the example transaction handler 106. Alternatively, the network 104 may be any type of network and/or combination of networks to communicatively couple the example clients 102 to the example transaction handler 106. For example, the network 104 may be any combination of local area networks, wide area networks, wireless networks, wired networks, cellular networks, public networks, private networks, etc.

The transaction handler 106 of the illustrated example is a server that receives transactions from the example clients 102 and processes the transactions. The type of processing performed by the transaction handler 106 depends on the type of the transaction. For example, if the transaction is a banking transaction, the example transaction handler may transfer monetary funds from one account to another, may dispense cash at an automated teller machine, etc. In addition to processing the transaction, the example transaction handler 106 stores a record of the transaction in the example data storage 108. Alternatively, the record of the transaction may be stored by the example transaction handler 106 in the example data storage prior to and/or during processing of the example transaction.

The example data storage 108 is a database that stores transaction information and context information received from the example data storage 108 for analysis by the example anomaly analyzer 110. Alternatively, the example data storage 108 may be any type of information storage (e.g., a file, a disk storage, a flash memory storage, etc.).

The example anomaly analyzer 110 of FIG. 1 analyzes the transaction and context information stored in the example data storage 108 to detect anomalies. The example anomaly analyzer 110 detects anomalies based on the transaction associated with its context. In other words, the example anomaly analyzer 110 determines anomalies not just on the transactions themselves but also based on the context for the transactions because transactions that may appear anomalous may not be anomalous in context. Upon determining that a transaction is anomalous, the example anomaly analyzer 110 takes an action (e.g., presents an alert, blocks a transaction, blocks transmission of a communication, triggers detection of another anomaly similar to the detected anomaly, etc.).

In operation, the example clients 102 transmit transactions to the example transaction handler 106 via the example network 104. The example transaction handler 106 processes the transactions and stores the transactions and context information in the example data storage 108. The example anomaly analyzer 110 analyzes the transactions stored in the example data storage 108 to detect anomalies and take action based on the detection.

Figure 2:
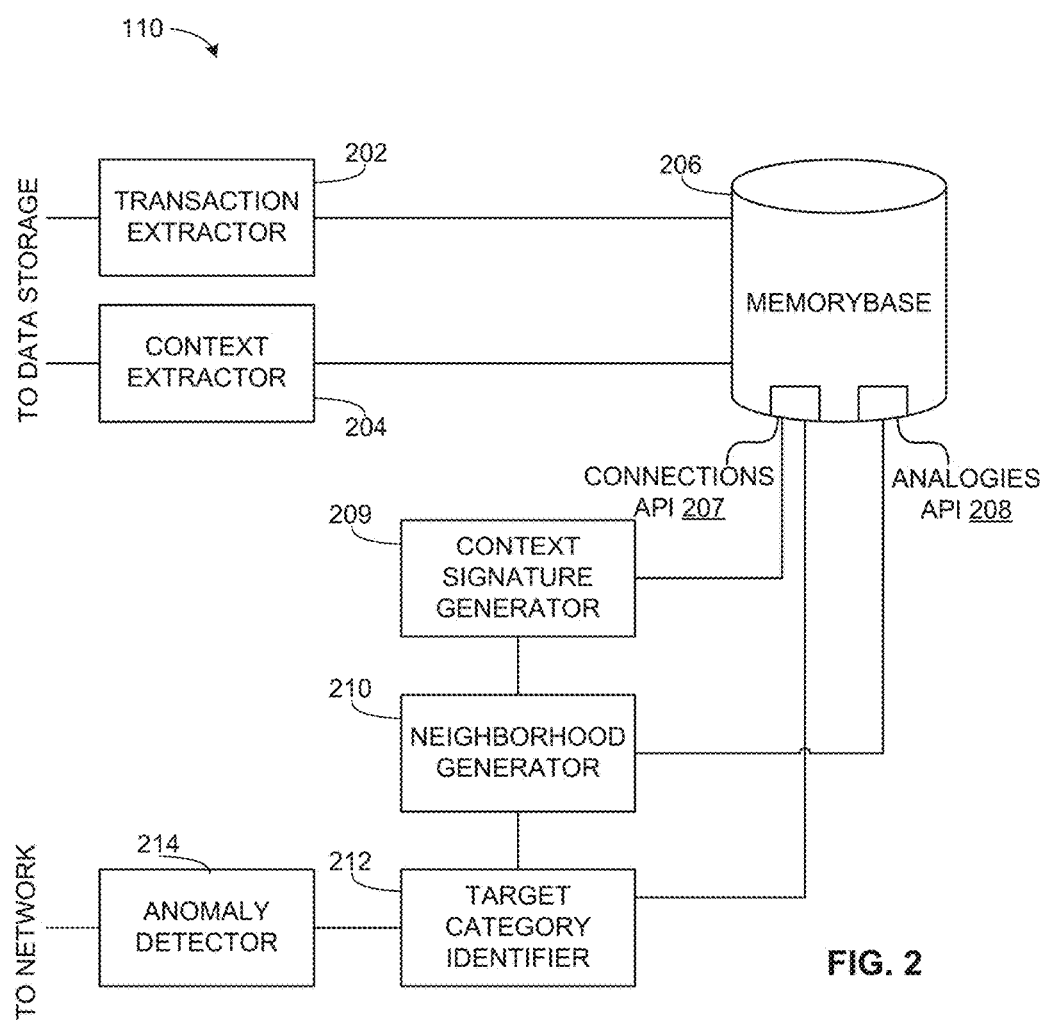
FIG. 2 is a block diagram of an example implementation of the anomaly analyzer of FIG. 1.

FIG. 2 is a block diagram of an example implementation of the anomaly analyzer 110 of FIG. 1. The example anomaly analyzer 110 of FIG. 2 includes an example transaction extractor 202, an example context extractor 204, an example memorybase 206 including an example connections application programming interface (API) 207 and an example analogies API 208, an example context signature generator 209, an example neighborhood generator 210, an example target category identifier 212, and an example anomaly detector 214.

The example transaction extractor 202 extracts transaction data from the example data storage 108 of FIG. 1 and stores the transactions in the example memorybase 206. The example context extractor 204 extracts context information from the example data storage 108 and stores the context information in the example memorybase 206 in association with the related transaction information. Alternatively, the transaction extractor 202 and the example context extractor 204 may access transaction and/or context information from a source other than the data storage 108. In another alternatively, the transaction extractor 202 and the context extractor 204 may not be included in the example anomaly analyzer 110 when the example transaction handler 106 stores the transaction and/or context information directly in the example memorybase 206.

The memorybase 206 of the illustrated example is an associative memorybase that provides the connections API 207 to generate connections information for an input query and the analogies API 208 to generate analogies for an input query. For example, the example memorybase 206 may be implemented by an associative memorybase from Saffron Technology®, an Intel® company. An associative memorybase is a content addressable memory that maintains associations between data elements (e.g., maps/links records based on the fields/categories of data stored in the records). For example, an associative memorybase may be implemented by a Hopfield neural network. The example memorybase 206 compares input search data against a table of stored data and efficiently returns the matching data to report associations between query parameters and data stored in the example memorybase 206.

The example connections API 207 of the example memorybase 206 identifies relationships among items in the memorybase 206. A query of the connections API 207 identifies one or more data categories and values, one or more categories to be used for associations, and a target. In other words, given a collection of attributes (category/value pairs), the connections API 207 returns a rank-ordered list of attributes associated with the input. For example, a connections query for financial transaction information may include a category-value pair signature comprised of monthly transactions of individual members at a banking location, a list of members for the associations, and the occupations of the members as the target, which returns a rank ordered list of all the associated connections to the query.

The example analogies API 208 of the example memorybase 206 identifies entities with similar connections as the query. In other words, given a category:value name of any attribute, analogies will be returned as a list of similar other attributes. The example analogies API 208 determines similarity using universal cognitive distance (UCD). Alternatively, any other similarity measure may be utilized. For example, in response to a query identifying an individual, the example analogies API 208 would return other individuals with similar connections (e.g., individuals that have similar context attributes). In such an example, a query of the analogies API 208 identifying the individual and identifying a monthly transactions category returns a list of individuals that are similar to the individual based on monthly transactions.

The example context signature generator 209 of the illustrated example generates a signature of context information for querying the example memorybase 206 to search for anomalies. For example, the signature may be a set of category value pairs (e.g., an example category may be monthly transaction level and a value may be $20,000, an example category may be monthly transaction volume and a value may be 20, an example category may be a location and a value may be Chicago, an example category may be account type and a value may be personal account, etc.). The context signature generator 209 of the illustrated example determines the categories that will be utilized for a data set. For example, the context signature generator 209 may perform a data analysis to identify categories that are important (e.g., may identify categories in which a deviation is greater than other categories, may determine categories in which similar values have greater deviation in another category, etc.). Categories to be utilized in the signature may be additionally or alternatively be identified by a user (e.g., a user may input an instruction that a particular category must be utilized or that a particular category must not be utilized). For example, a user may indicate that they want to analyze accounts with a monthly transaction volume of $20,000, for a Chicago location, on personal accounts.

The example context signature generator 209 additionally queries the example connections API 207 of the example memorybase 206 to determine entities associated with the example context signature and retrieve a chosen target category(ies). For example, for a financial transaction anomaly analysis, the chosen target category may be occupation. The example context signature generator 209 obtains a list of entities with the associated target value from the example connections API 207. The example context signature generator 209 transmits the list of entities and the context signature to the example neighborhood generator 210.

The neighborhood generator 210 of the illustrated example, builds a neighborhood (e.g., a group of similar entities) for each entity in the list of entities received from the example context signature generator 209 based one or more target categories. To generate the neighborhood, the example neighborhood generator 210 queries the example analogies API 208 with a query identifying an entity from the list of entities and identifying the context signature from the example context signature generator 209. In response to the query, the example neighborhood generator 210 receives a list of entities similar to the entity identified in the query based on the context signature. For example, the neighborhood generator 210 may generate a first neighborhood of individuals based on a shared occupation, a second neighborhood based on a shared location, etc. The example neighborhood generator 210 transmits the identified neighborhood and the context signature to the example target category identifier 212.

The example target category identifier 212 queries the example connections API 207 for each entity in a neighborhood to determine the target category value for each entity. For example, when the example neighborhood generator 210 queries the example analogies API 208 based on occupation, the analogies API 208 returns a list of entities for the neighborhood but does not return the categories/attributes of the entities (e.g., the monthly transaction level). For an example financial transaction analysis, the example neighborhood generator 210 queries the connections API 207 to determine the monthly transaction level for each entity identified in a neighborhood. The example target category identifier 212 transmits the neighborhood to the example anomaly detector 212.

The example anomaly detector 214 analyzes the neighborhood based on the target category value to determine a score for the entity for which the neighborhood was generated. The example anomaly detector 214 determines the score based on the deviation of the target category value of the entity for which the neighborhood was generated compared with the target category values of the other entities in the neighborhood. For example, if the neighborhood for a first entity is generated based on the first entity's occupation (unemployed) and the target category is monthly transaction level, the score for the first entity is based on the amount the monthly transaction level of the first entity differs from the other entities in the neighborhood. For example, more anomalous score may be assigned when the first entity has a very high transaction level (e.g., $20,000) compared with the other unemployed entities transaction levels (e.g., around $2,000).

The example anomaly detector 214 sums all of the scores assigned to a transaction across the analysis. For example, for a transaction, a neighborhood may be generated for each category/field for the transaction and scores may be determined for the transaction in each neighborhood. The example anomaly detector 214 determines a score for the transaction in each neighborhood and adds the scores. In addition, the example anomaly detector 214 compares the summed scores for each transaction (e.g., each transaction identified on the list of transactions generated by the example context signature generator 209). The example anomaly detector 214 analyzes the scores to determine if an anomaly is detected. For example, as described further in detail in conjunction with FIG. 4, the example anomaly detector 214 may determine whether any transaction scores meet a threshold, whether any transaction scores are greater than the standard deviation or twice the standard deviation of the transaction scores, etc.

Upon determining an anomaly, the example anomaly detector 214 performs an action. According to the illustrated example, the action is presentation of an alert. Alternatively, any other action may be performed by the example anomaly detector 214. For example, if the example anomaly analyzer 110 is analyzing electronic communications within a computer network, the anomaly detector 214 may block or otherwise prevent a transaction (e.g., by communicating with a gateway, firewall, switch, etc.) associated with a detected anomaly.

While an example manner of implementing the example anomaly analyzer 110 of FIG. 1 is illustrated in FIG. 2, one or more of the elements, processes and/or devices illustrated in FIG. 2 may be combined, divided, re-arranged, omitted, eliminated and/or implemented in any other way. Further, the example transaction extractor 202, the example context extractor 204, the example memorybase 206, the example context signature generator 209, the example neighborhood generator 210, the example target category identifier 212, the example anomaly detector 214 and/or, more generally, the example anomaly analyzer 110 of FIG. 2 may be implemented by hardware, software, firmware and/or any combination of hardware, software and/or firmware. Thus, for example, any of the example transaction extractor 202, the example context extractor 204, the example memorybase 206, the example context signature generator 209, the example neighborhood generator 210, the example target category identifier 212, the example anomaly detector 214 and/or, more generally, the example anomaly analyzer 110 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example transaction extractor 202, the example context extractor 204, the example memorybase 206, the example context signature generator 209, the example neighborhood generator 210, the example target category identifier 212, the example anomaly detector 214 and/or, more generally, the example anomaly analyzer 110 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example anomaly analyzer 110 may include one or more elements, processes and/or devices in addition to, or instead of, those illustrated in FIG. 2, and/or may include more than one of any or all of the illustrated elements, processes and devices.

Figure 3:
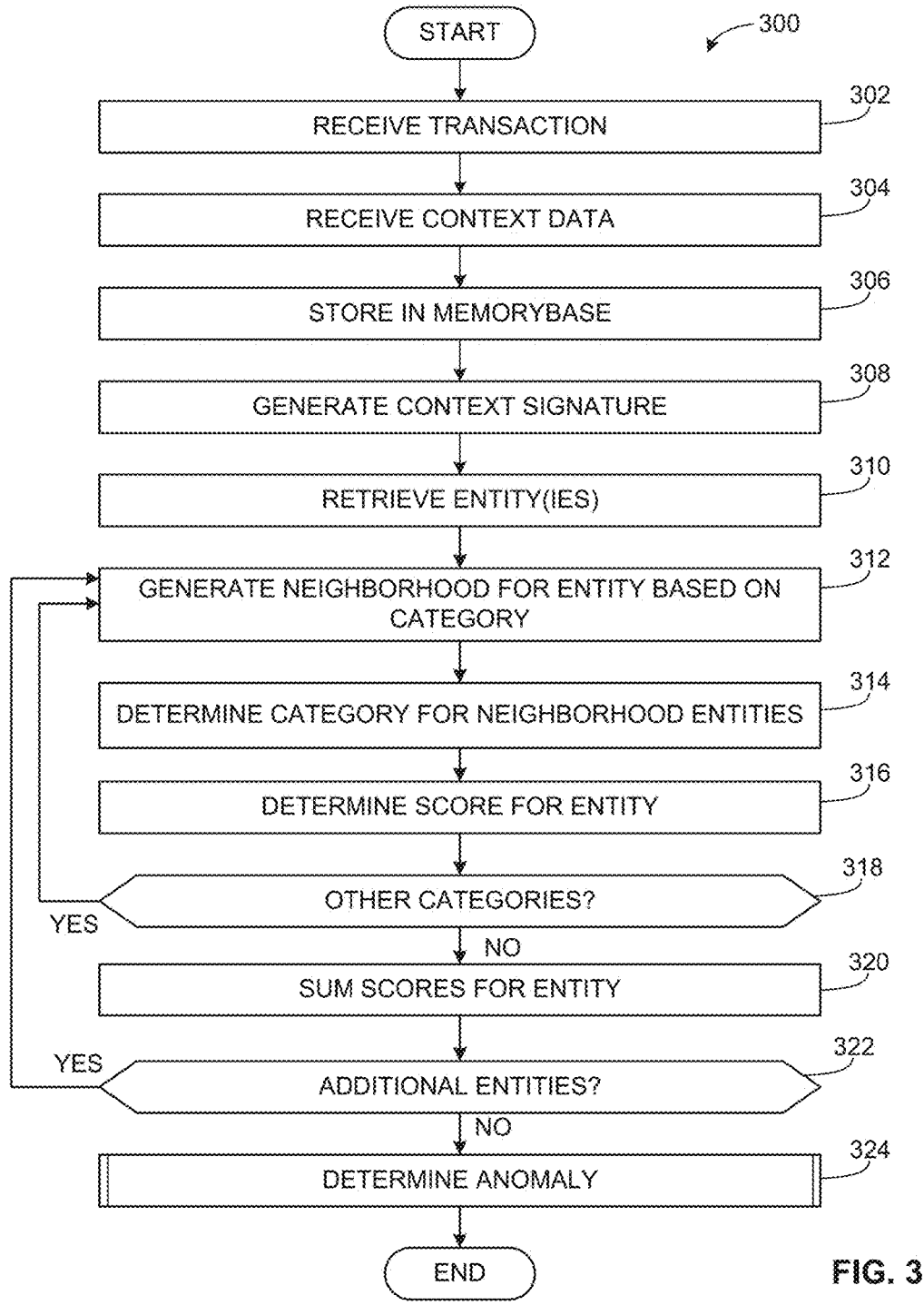
FIGS. 3-4 are a flow diagrams representative of example machine readable instructions that may be executed to implement the anomaly analyzer if FIG. 1 and/or FIG. 2.
Figure 4:
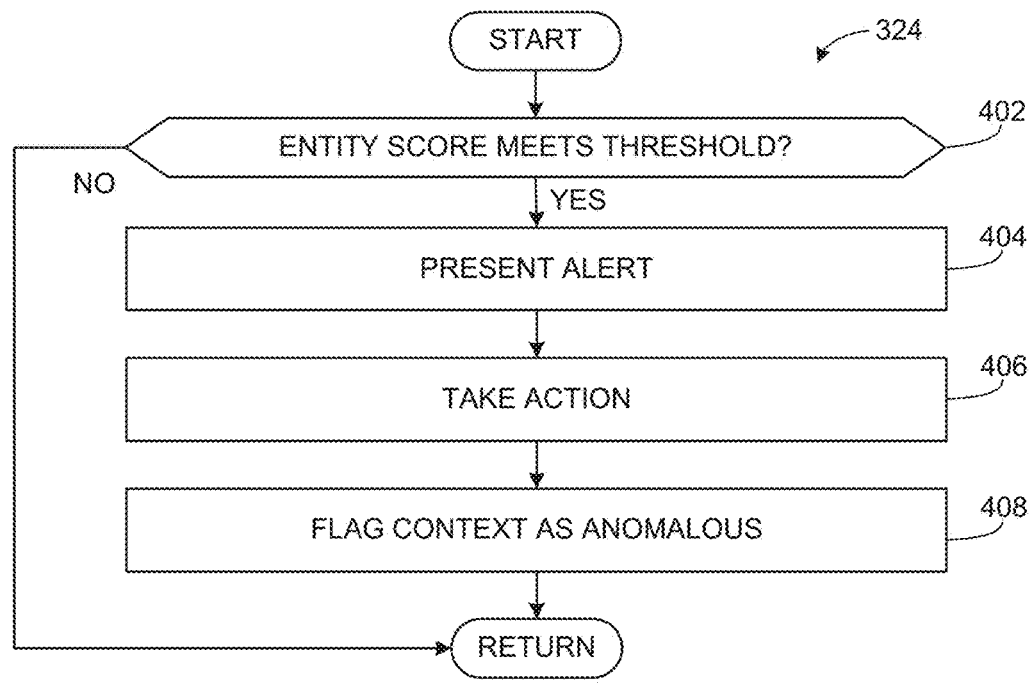

Flowcharts representative of example machine readable instructions for implementing the example anomaly analyzer 110 of FIG. 1, and/or FIG. 2 are shown in FIG. 3 and FIG. 4. In this example, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 3 and FIG. 4, many other methods of implementing the example anomaly analyzer 110 may alternatively be used. For example, the order of execution of the blocks may be changed, and/or some of the blocks described may be changed, eliminated, or combined.

As mentioned above, the example processes of FIG. 3 and/or FIG. 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 3 and/or FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example process 300 of FIG. 3 begins when the example transaction extractor 202 receives transaction data (e.g., from the example data storage 108) (block 302). The example context extractor 204 receives context data (e.g., from the example data storage 108) (block 304). The example transaction extractor 202 and the example context extractor 204 store the transaction data and context data in the example memorybase 206 (e.g., historical data) (block 306). While the illustrated includes a flow that includes the receipt and storage transaction data and context data in conjunction with anomaly detection, the receipt and storage may be performed as a separate process (e.g., the anomaly detection may be performed at a time after the data is collected and stored).

The example context signature generator 209 generates a context signature of categories and values for use in anomaly analysis (block 308). The example context signature generator 209 determines a list of entities that are associated with the context signature (block 310). For example, the context signature generator 209 of the illustrated example queries the connections API 207 to determine the list of entities. The example query may be formatted as q=(C1:v1, C2:v2, C3:v3)&c=label&c=target, where C1, C2, C3 are categories of data; v1, v2, v3 are values for the categories, (C1:v1, C2:v2, C3:v3) represents the context signature, c=label identifies the field to be used as the label for the entity results of the query, and c=target identifies a target category that should be returned for each entity. For example, an example first table 502 in FIG. 5 illustrates an example of transactions (e.g., entities) and context data (e.g., occupation, monthly transaction level, city, account type) that may be stored in the example memorybase 206. An example second table 504 in FIG. 5 illustrates an example list of entities determined when a context signature identifying a monthly transaction level of $20,000 is applied to the data of the example first table 502. While the example signature of $20,000 includes a single category, any number of categories and values may be utilized.

The example neighborhood generator 210 determines a neighborhood (e.g., similar entities) for an entity in the list of retrieved entities (block 312). For example, the example neighborhood generator 210 determines a neighborhood for a transaction by querying the example analogies API 208 of the example memorybase using the example context signature. The example query may be formatted as a=label:a1&isc=C1&isc=C2&isc=C3, where C1, C2, C3 are the categories of the context signature; and label:a1 identifies the categories to be used in determining the neighborhood. The example query may be formatted as q=(label:a1, label:a2, label:a3)&c=target, where label:a1, label:a2, label:a3 identify entities of the neighborhood, and c=target identifies the target category to be reported (block 314). Alternatively, if the query in block 312 to generate the neighborhood returns the target value, block 314 may be skipped.

The example anomaly detector 214 then determines a score for the entity for which the neighborhood was generated (block 316). For example, the example anomaly detector 214 determines the score based on the deviation of the target category value of the transaction compared with the target category value of the other transactions in the neighborhood. An example third table 508 identifies a neighborhood for Peter Wilson (entry number 4 in the example second table 504) based on the occupation category (e.g., returning other entities that have a matching occupation) that may be generated by blocks 312 and 314. The example third table 508 additionally identifies a score (e.g., 0.5) determined by the example anomaly detector in accordance with block 316.

The example neighborhood generator 210 determines if there are further categories to be analyzed through neighborhood generation (block 318). When there are further categories to be analyzed, control turns to block 312 to generate the next neighborhood for the entity. For example, according to the example illustrated in FIG. 5, a fourth example table 510 is generated and scored based on the City category. As illustrated in FIG. 5, the example score for Peter Wilson in the third table 508 is much greater than the score in the fourth table 510 because there is a greater deviation in monthly transaction level for Peter Wilson when looking at the neighborhood of unemployed entities than when looking at the neighborhood of Seattle residents.

When there are no further categories to be analyzed for the currently selected entity (e.g., the entity selected from the results of block 310) (block 318), the example anomaly detector 214 determines a total score for the entity (block 320). For example, according to the illustrated example, the total score is the sum of the scores determined for the entity in each of the generated neighborhoods. For example, according to the illustrated example of FIG. 5, the total score for Peter Wilson would be the sum of score from the third table 508 (e.g., 0.5), the score from the fourth table 510 (e.g., 0.1), and any other scores determined for other neighborhoods for Peter Wilson (e.g., 0.3) (e.g., a total score of 0.9).

The example neighborhood detector 210 then determines if there are further entities to analyze from the list of entities determined in block 310 (block 322). For example, according to the illustrated example of FIG. 5, after analyzing and scoring Peter Wilson in the example third table 508 and the example fourth table 510 (and other neighborhoods not shown), the example neighborhood generator 210, the example target category identifier 212, and the example anomaly detector analyze and score John Smith, Jane Doe, and Mark Johnson according to blocks 312-322.

When there are no further entities remaining to be analyzed (block 322), the example anomaly detector 214 determines if an anomaly is present in the data (block 324). For example, the example anomaly detector 214 may gather the scores determined for each of the entities. According to the example of FIG. 5, the example anomaly detector generates an example fifth table 512 that includes the scores determined for each of the entities from the example second table 504. According to FIG. 5, the example anomaly detector 214 compares the scores to twice the standard deviation of the scores. Accordingly, the scores that meet twice the standard deviation (e.g., equal, exceed, etc.) are identified as anomalous (e.g., Peter Wilson is identified anomalous, which is heavily influenced by the fact that he has a transaction level that is far greater than the transaction level of his unemployed peers even though his transaction level does not appear exceptional when compared with all other entities in the example first table 502). Further details of an example anomaly detection process are described in conjunction with FIG. 4.

While the example process of FIG. 3 as illustrated in FIG. 5 generates neighborhoods for single categories, combinations of categories may be utilized to perform further analysis (e.g., analyzing combinations may reveal that a transaction level is anomalous when looking at a neighborhood for occupation and location (e.g., in the monthly transaction level example, transaction levels for occupation may vary greatly in different cities)).

FIG. 4 is a flowchart illustrating an example process to detect anomalies to implement block 324 of FIG. 3. The example process of FIG. 4 begins when the example anomaly detector 214 determines if a score for an entity (e.g., the scores from block 320 illustrated in the fifth table 512 of FIG. 5) meets a threshold (block 402). For example, a predetermined threshold may be utilized, a threshold based on the determined scores may be utilized (e.g., a multiple of the standard deviation of the scores, a multiple of the mean or median of the scores, etc.). When no scores meet the threshold, the process of FIG. 4 ends.

When one or more scores meet the threshold (block 402), the example anomaly detector 214 presents an alert identifying the anomalous entity(ies) (block 404). The example anomaly detector 214 then performs an action to address the anomaly (block 406). For example, the action may include transmitting an electronic request to block a financial transaction (e.g., transmitting the request to the example transaction handler 106), transmitting an electronic notification of the anomaly, blocking an electronic communication (e.g., a communication identified as anomalous may be unsolicited mail, malware, etc.), rejecting a billing item or invoice, etc.

The example anomaly detector 214 then flags or labels the context signature associated with the identified anomaly(ies) (e.g., the categories value pairs of the signature) as anomalous (block 408). For example, the signature may be utilized for detecting further anomalies in which an entity has a similar signature (e.g., the entities in the example memory-base 502 may be compared to the category:value pairs of the anomalous entity and any matching entities may be alerted as possibly anomalous. The process of FIG. 4 then ends.

While the process of FIG. 4 includes detecting and alerting on certain scores, the anomaly detector 214 may generate a report identifying the entities analyzed and the determined scores. For example, a person may review the report and take appropriate action (e.g., conduct a further investigation).

Figure 6:
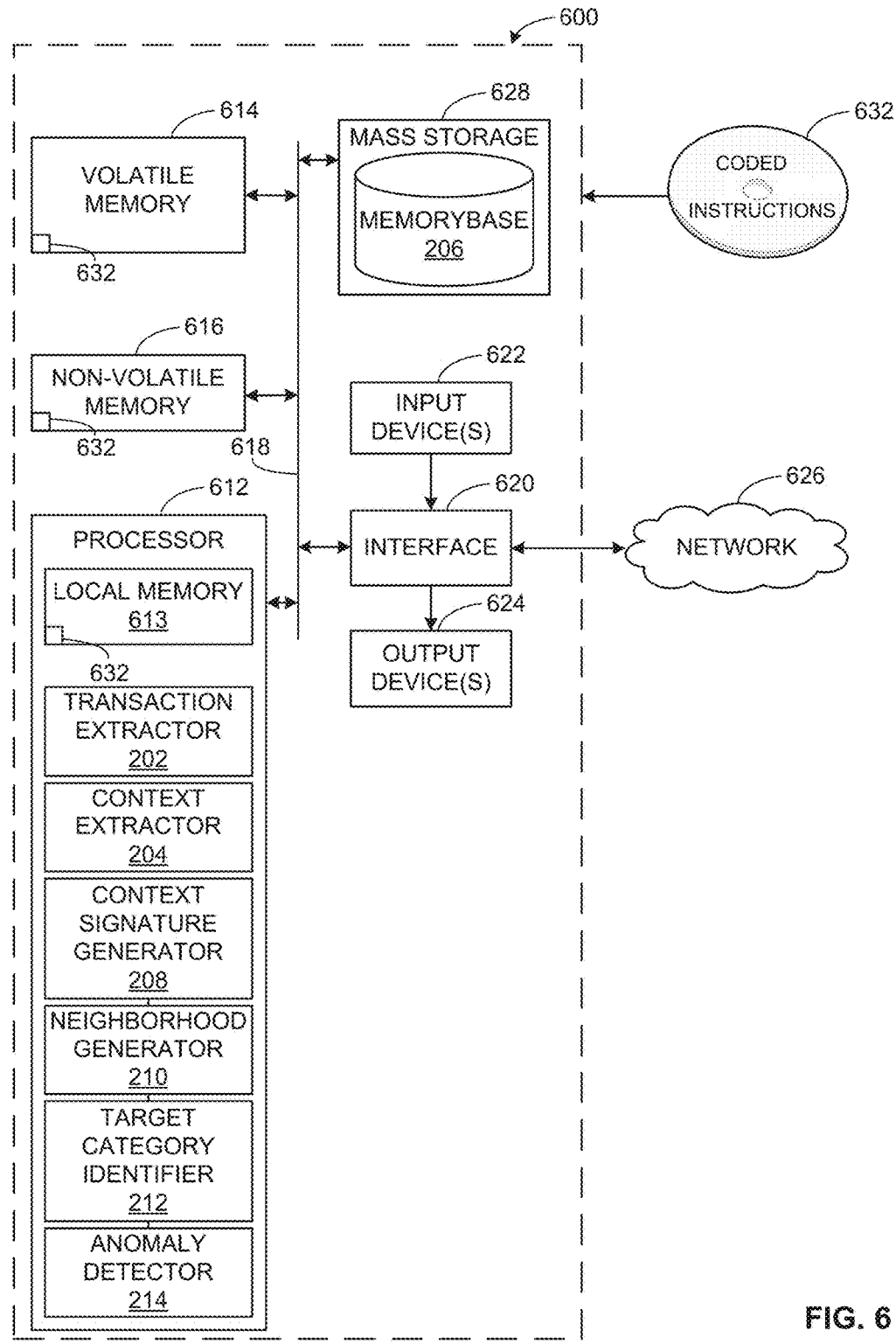
FIG. 6 is a block diagram of an example processor system structured to execute the example machine readable instructions represented by FIG. 3 and/or FIG. 4 to implement the example anomaly analyzer of FIG. 1 and/or FIG. 2.

FIG. 6 is a block diagram of an example processor platform 600 capable of executing the instructions of FIGS. 3 and/or 4 to implement the example anomaly analyzer 110 of FIG. 1 and/or FIG. 2. The processor platform 600 can be, for example, a server, a personal computer, a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The example processor 612 includes the example transaction extractor 202, the example context extractor 204, the example context signature generator 209, the example neighborhood generator 210, the example target category identifier 212, and the example anomaly detector 214. The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives. The example mass storage devices 628 stores the example memorybase 206.

The coded instructions 632 of FIG. 6 may be stored in the mass storage device 628, in the volatile memory 614, in the non-volatile memory 616, and/or on a removable tangible computer readable storage medium such as a CD or DVD.

From the foregoing, it will be appreciated that the above-described methods and apparatus facilitate efficient identification of anomalous data (e.g., even in very large data sets). The foregoing methods and apparatus effectively detect anomalies based on context (e.g., possibly including a plurality of categories and/or combinations of categories of data) when an individual value may not appear anomalous when compared with all records (e.g., a transaction level that does not look anomalous until an individuals occupation is considered). By utilizing an associative memorybase/content addressable memory, the computing resources needed for identifying connections and similar records is reduced, thus improving the operation of computing devices conducting anomaly detection.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems and articles of manufacture to detect anomalies in electronic data are disclosed herein. Further examples and combinations thereof include the following.

Example 1 is an apparatus to detect anomalies in electronic data, the apparatus comprising: a signature generator to generate a signature of context information for electronic transactions and to query a memorybase of previously received electronic transactions to identify a first entity associated with a subset of historical transactions that are associated with the signature, a neighborhood generator to query the memorybase to generate a neighborhood for the first entity, a target category identifier to determine a target category value for entities included in the neighborhood, and an anomaly detector to determine a score for the first entity based on the target category value and to present an alert indicating that the first entity is anomalous based on the score.

Example 2 includes the apparatus as defined in example 1, wherein the anomaly detector is further to take an action in response to detecting the first entity.

Example 3 includes the apparatus as defined in example 2, wherein the action includes preventing a transaction from the first entity.

Example 4 includes the apparatus as defined in example 1, further including a transaction extractor to receive a transaction from a client via a network.

Example 5 includes the apparatus as defined in example 4, further including a context extractor to receive context information associated with the transaction via the network.

Example 6 includes the apparatus as defined in one of examples 1-5, wherein the memorybase is an associative memorybase and includes a first application programming interface to serve queries for connections and a second application programming interface to serve queries for analogies.

Example 7 includes the apparatus as defined in example 6, wherein the signature generator is to transmit a query including the signature to the first application programming interface of the memorybase to identify the first entity.

Example 8 includes the apparatus as defined in example 7, wherein the query returns a plurality of entities.

Example 9 includes the apparatus as defined in one of example 1-5, wherein the neighborhood generator is to transmit a query including the first entity to the second application program interface to generate the neighborhood.

Example 10 includes the apparatus as defined in one of example 1-5, wherein the anomaly detector is to determine scores for a plurality of entities identified from the query of the memorybase of previously received electronic transactions.

Example 11 is method to detect anomalies in electronic data, the method comprising: generating a signature of context information for electronic transactions, querying a memorybase of previously received electronic transactions to identify a first entity associated with a subset of historical transactions that are associated with the signature, querying the memorybase to generate a neighborhood for the first entity, determining a target category value for entities included in the neighborhood, determining a score for the first entity based on the target category value, and presenting an alert indicating that the first entity is anomalous based on the score.

Example 12 includes the method as defined in example 11, further including performing an action in response to detecting the first entity.

Example 13 includes the method as defined in example 12, wherein the action includes preventing a transaction from the first entity.

Example 14 includes the method as defined in one of examples 11-13, further including receiving a transaction from a client via a network.

Example 15 includes the method as defined in example 14, further including receiving context information associated with the transaction via the network.

Example 16 includes the method as defined in one of examples 11-13, wherein the memorybase is an associative memorybase and includes a first application programming interface to serve queries for connections and a second application programming interface to serve queries for analogies.

Example 17 includes the method as defined in example 16, further including transmitting a query including the signature to the first application programming interface of the memorybase to identify the first entity.

Example 18 includes the method as defined in example 17, wherein the query returns a plurality of entities.

Example 19 includes the method as defined in example 16, further including submitting a query including the first entity to the second application program interface to generate the neighborhood.

Example 20 includes the method as defined in one of examples 11-13, further including determining scores for a plurality of entities identified from the query of the memorybase of previously received electronic transactions.

Example 21 is a non-transitory machine readable storage medium comprising instructions that, when executed, cause a machine to at least: generate a signature of context information for electronic transactions, query a memorybase of previously received electronic transactions to identify a first entity associated with a subset of historical transactions that are associated with the signature, query the memorybase to generate a neighborhood for the first entity, determine a target category value for entities included in the neighborhood, determine a score for the first entity based on the target category value, and present an alert indicating that the first entity is anomalous based on the score.

Example 22 includes the non-transitory machine readable storage medium as defined in example 21, wherein the instructions, when executed, cause the machine to perform an action in response to detecting the first entity.

Example 23 includes the non-transitory machine readable storage medium as defined in example 22, wherein the action includes preventing a transaction from the first entity.

Example 24 includes the non-transitory machine readable storage medium as defined in one of examples 21-23, wherein the instructions, when executed, cause the machine to receive a transaction from a client via a network.

Example 25 includes the non-transitory machine readable storage medium as defined in example 24, wherein the instructions, when executed, cause the machine to receive context information associated with the transaction via the network.

Example 26 includes the non-transitory machine readable storage medium as defined in one of examples 21-23, wherein the memorybase is an associative memorybase and includes a first application programming interface to serve queries for connections and a second application programming interface to serve queries for analogies.

Example 27 includes the non-transitory machine readable storage medium as defined in example 26, wherein the instructions, when executed, cause the machine to transmit a query including the signature to the first application programming interface of the memorybase to identify the first entity.

Example 28 includes the non-transitory machine readable storage medium as defined in example 27, wherein the query returns a plurality of entities.

Example 29 includes the non-transitory machine readable storage medium as defined in example 26, wherein the instructions, when executed, cause the machine to submit a query including the first entity to the second application program interface to generate the neighborhood.

Example 30 includes the non-transitory machine readable storage medium as defined in one of examples 21-23, wherein the instructions, when executed, cause the machine to determine scores for a plurality of entities identified from the query of the memorybase of previously received electronic transactions.

Example 31 is an apparatus to detect anomalies in electronic data, the apparatus comprising: means for generating a signature of context information for electronic transactions, means for querying a memorybase of previously received electronic transactions to identify a first entity associated with a subset of historical transactions that are associated with the signature, means for querying the memorybase to generate a neighborhood for the first entity, means for determining a target category value for entities included in the neighborhood, means for determining a score for the first entity based on the target category value, and presenting an alert indicating that the first entity is anomalous based on the score.

Example 32 includes the apparatus as defined in example 31, further including means for performing an action in response to detecting the first entity.

Example 33 includes the apparatus as defined in example 32, wherein the action includes preventing a transaction from the first entity.

Example 34 includes the apparatus as defined in one of examples 31-33, further including means for receiving a transaction from a client via a network.

Example 35 includes the apparatus as defined in example 34, further including means for receiving context information associated with the transaction via the network.

Example 36 includes the apparatus as defined in one of examples 31-33, wherein the memorybase is an associative memorybase and includes a first application programming interface to serve queries for connections and a second application programming interface to serve queries for analogies.

Example 37 includes the apparatus as defined in example 36, further including means for transmitting a query including the signature to the first application programming interface of the memorybase to identify the first entity.

Example 38 includes the apparatus as defined in example 37, wherein the query returns a plurality of entities.

Example 39 includes the apparatus as defined in example 36, further including means for submitting a query including the first entity to the second application program interface to generate the neighborhood.

Example 40 includes the apparatus as defined in one of examples 31-33, further including means for determining scores for a plurality of entities identified from the query of the memorybase of previously received electronic transactions.

What is claimed is:

1. An apparatus to detect anomalies in electronic data, the apparatus comprising:
    a signature generator to generate a signature of context information for electronic transactions and to query a memorybase of previously received electronic transactions to identify a first entity associated with a subset of historical transactions that are associated with the signature, wherein the memorybase is an associative memorybase and includes a first application programming interface to serve queries for connections and a second application programming interface to serve queries for analogies;
    a neighborhood generator to query the memorybase to generate a neighborhood for the first entity;
    a target category identifier to determine a target category value for entities included in the neighborhood; and
    an anomaly detector to determine a score for the first entity based on the target category value and to present an alert indicating that the first entity is anomalous based on the score.

2. An apparatus as defined in claim 1, wherein the anomaly detector is further to take an action in response to detecting the first entity.

3. An apparatus as defined in claim 2, wherein the action includes preventing a transaction from the first entity.

4. An apparatus as defined in claim 1, further including a transaction extractor to receive a transaction from a client via a network.

5. An apparatus as defined in claim 4, further including a context extractor to receive context information associated with the transaction via the network.

6. An apparatus as defined in claim 1, wherein the signature generator is to transmit a query including the signature to the first application programming interface of the memorybase to identify the first entity.

7. An apparatus as defined in claim 6, wherein the query returns a plurality of entities.

8. An apparatus as defined in claim 1, wherein the neighborhood generator is to transmit a query including the first entity to the second application program interface to generate the neighborhood.

9. An apparatus as defined in claim 1, wherein the anomaly detector is to determine scores for a plurality of entities identified from the query of the memorybase of previously received electronic transactions.

10. A method to detect anomalies in electronic data, the method comprising:
   generating a signature of context information for electronic transactions;
   querying a memorybase of previously received electronic transactions to identify a first entity associated with a subset of historical transactions that are associated with the signature, wherein the memorybase is an associative memorybase and includes a first application programming interface to serve queries for connections and a second application programming interface to serve queries for analogies;
   querying the memorybase to generate a neighborhood for the first entity;
   determining a target category value for entities included in the neighborhood;
   determining a score for the first entity based on the target category value; and
   presenting an alert indicating that the first entity is anomalous based on the score.

11. A method as defined in claim 10, further including performing an action in response to detecting the first entity.

12. A method as defined in claim 11, wherein the action includes preventing a transaction from the first entity.

13. A method as defined in claim 10, further including receiving a transaction from a client via a network.

14. A method as defined in claim 13, further including receiving context information associated with the transaction via the network.

15. A method as defined in claim 10, further including transmitting a query including the signature to the first application programming interface of the memorybase to identify the first entity.

16. A method as defined in claim 15, wherein the query returns a plurality of entities.

17. A method as defined in claim 10, further including submitting a query including the first entity to the second application program interface to generate the neighborhood.

18. A method as defined in claim 17, further including determining scores for a plurality of entities identified from the query of the memorybase of previously received electronic transactions.

19. A non-transitory machine readable storage medium comprising instructions that, when executed, cause a machine to at least:
   generate a signature of context information for electronic transactions;
   query a memorybase of previously received electronic transactions to identify a first entity associated with a subset of historical transactions that are associated with the signature, wherein the memorybase is an associative memorybase and includes a first application programming interface to serve queries for connections and a second application programming interface to serve queries for analogies;
   query the memorybase to generate a neighborhood for the first entity;
   determine a target category value for entities included in the neighborhood;
   determine a score for the first entity based on the target category value; and
   present an alert indicating that the first entity is anomalous based on the score.

20. A non-transitory machine readable storage medium as defined in claim 19, wherein the instructions, when executed, cause the machine to perform an action in response to detecting the first entity.

21. A non-transitory machine readable storage medium as defined in claim 20, wherein the action includes preventing a transaction from the first entity.

22. A non-transitory machine readable storage medium as defined in claim 19, wherein the instructions, when executed, cause the machine to receive a transaction from a client via a network.

23. A non-transitory machine readable storage medium as defined in claim 22, wherein the instructions, when executed, cause the machine to receive context information associated with the transaction via the network.

* * * * *